Oct. 31, 1967   W. E. GRAHAM   3,350,113
MODULAR TRANSPORTATION EQUIPMENT
Filed May 10, 1966   3 Sheets-Sheet 1

INVENTOR
WALTER E. GRAHAM
BY Mason, Fenwick & Lawrence
ATTORNEYS

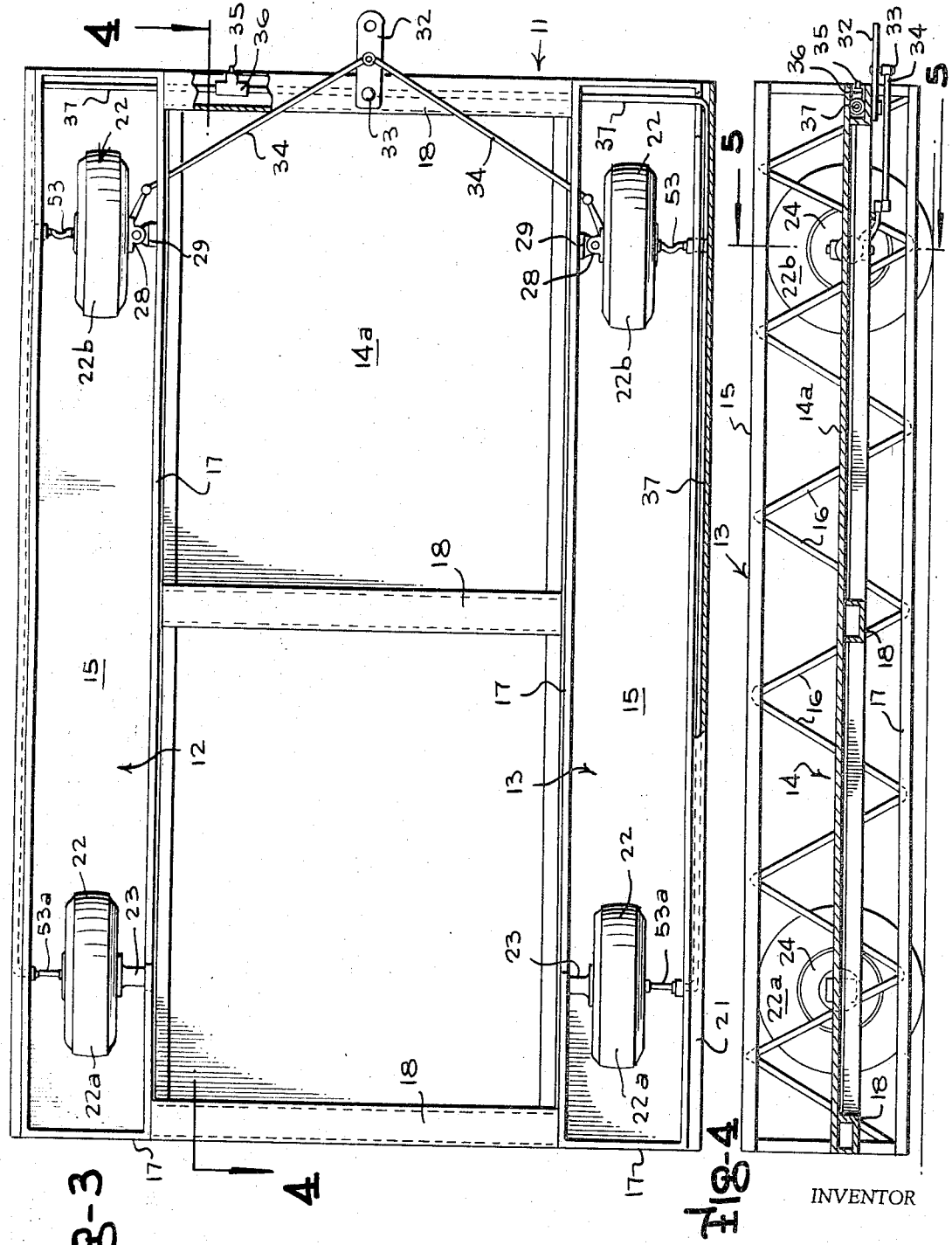

Oct. 31, 1967 W. E. GRAHAM 3,350,113
MODULAR TRANSPORTATION EQUIPMENT
Filed May 10, 1966 3 Sheets-Sheet 3
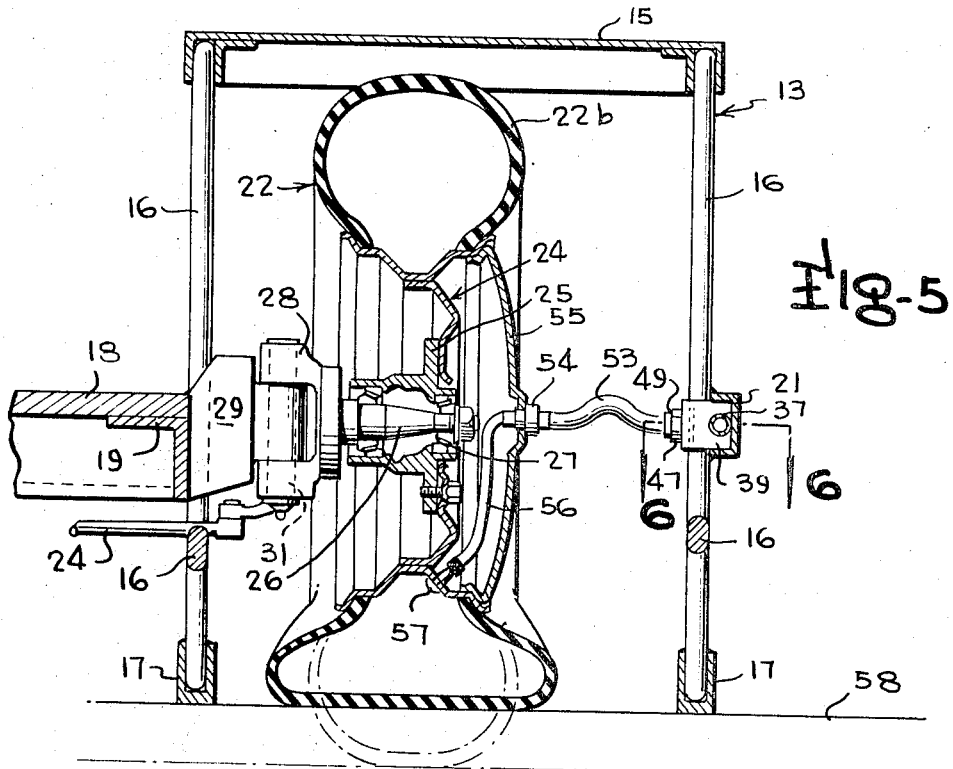
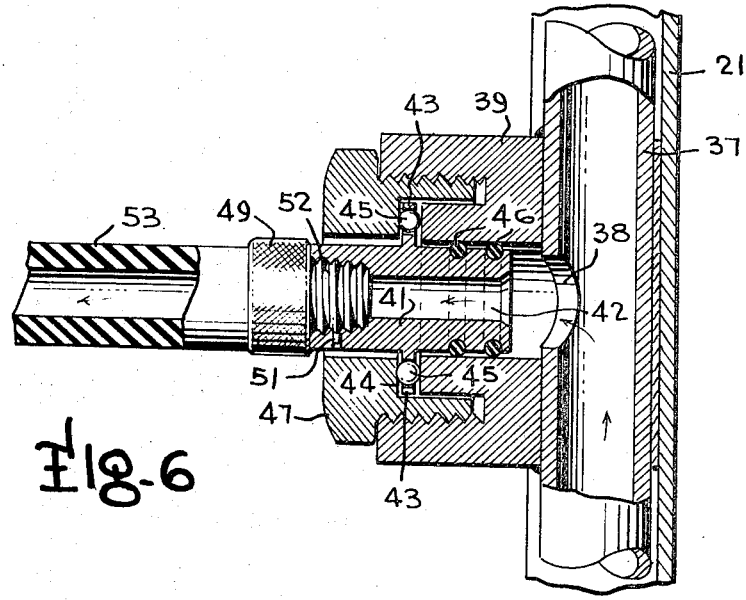
INVENTOR
WALTER E. GRAHAM
BY Mason, Fenwick & Lawrence
ATTORNEYS United States Patent Office 3,350,113
Patented Oct. 31, 1967

3,350,113
MODULAR TRANSPORTATION EQUIPMENT
Walter E. Graham, 1140 Karen Road,
Montgomery, Ala. 36109
Filed May 10, 1966, Ser. No. 549,049
2 Claims. (Cl. 280—43.23)

ABSTRACT OF THE DISCLOSURE

A modular transportation vehicle having pneumatic tires and means for simultaneously deflating the tires to cause the body of the vehicle to rest upon an underlying supporting surface or to rise from the supporting surface to enable rolling movement of the vehicle on the tires.

---

The present invention relates in general to transportation equipment, and more particularly to transportation equipment having a modular design for transporting freight in a unitary manner in large size carriers such as trucks and railroad cars or other suitable means.

One of the more pressing problems encountered by large trucking firms, and also encountered by carriers such as railroads, is the problem of providing labor at docking facilities to effect loading and unloading of freight at the destination point. Quite often, upon arrival at a warehouse docking facility, the fully loaded carriers many times must wait extensive periods before the freight may be off-loaded by manual labor involving large numbers of crewman. Normally this unloading is almost entirely manual wherein the crewmen carry individual boxes, or at best, a very limited number of containers at any one time by mechanical means.

Once the carrier is unloaded, the same problem in reverse presents itself again in order that the carrier may be prepared for shipment. Since such manual labor is extremely expensive, a novel approach has been sought to obviate the problems encountered so as to put the operation on a more mechanized basis. The approach presented herein has the advantage of short downtime for the carrier at the docking facility since the loads may be made up far in advance and easily loaded onto the carrier in a very short time. In addition, smaller docking facilities may be utilized because of the speed of the loading and unloading operation now envisioned.

Therefore, an object of this invention is the provision of a transportation equipment adapted to be used in a modular concept to receive and transport containers, whereby freight pickup, transport and delivery will be greatly accelerated and the cost thereof greatly reduced.

Another object of this invention is the provision of transportation equipment which will be utilized with carriers going by air, highway, rail or sea.

And yet, another object of this invention is the provision of a materials handling unit that allows a load of freight of any shape, size or weight to be placed upon the unit so that it may be integrally moved about with the unit.

Another object of the present invention is the provision of materials handling transportation equipment having rolling supports which may be, in effect, rolled to permit the loaded transportation equipment to be self-supported, lowered to the supporting surface and firmly anchored during transshipment of the freight, and yet may be raised again when the freight reaches its destination so that the transportation equipment may be readily moved about.

A still further object of the invention is the provision of suitable means for raising and lowering the transportation equipment vehicle in an extremely short period of time.

Other objects, capabilities and advantages of the invention will become apparent from the following description, taken in conjunction with the accompanying drawings showing only a preferred embodiment of the invention.

In the drawings:

FIGURE 3 is a bottom plan view of the invention;

FIGURE 4 is a vertical section view taken along lines 4—4 of FIGURE 3;

FIGURE 5 is a vertical section view taken along lines 5—5 of FIGURE 4, showing the tire inflation mechanism in enlarged detail; and FIGURE 6 is a horizontal section view taken along lines 6—6 of FIGURE 5 showing the individual tire connection point to the main air supply conduit.

Figure 1:
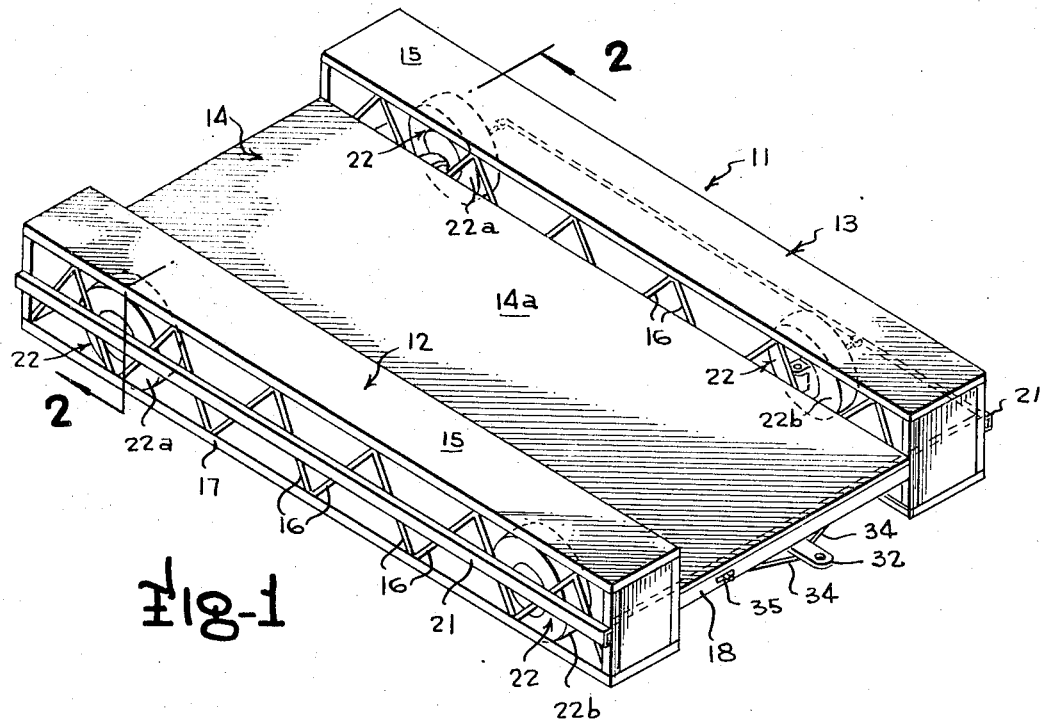
FIGURE 1 is a perspective view of the overall transportation equipment utilizing pneumatic tires envisioned by the present invention.
Figure 2:
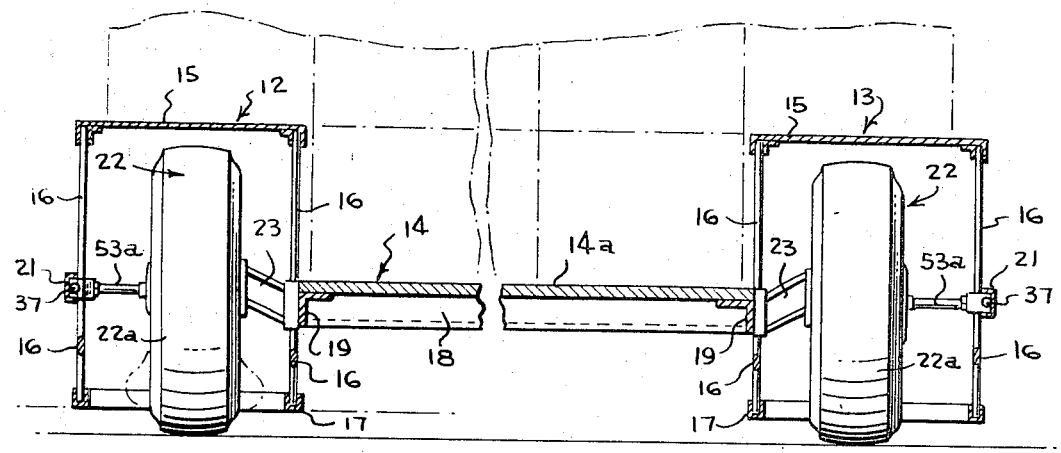
FIGURE 2 is a vertical section view taken along lines 2—2 of FIGURE 1, showing the rear portion of the transportation equipment.

Referring to the drawings wherein like reference characters designate corresponding parts throughout the several figures, the modular transportation equipment of the present invention comprises spaced elongated longitudinally disposed parallel wheel well covers 12, 13 interconnected by a flat bed 14 which constitutes the load carrying surfaces of the vehicle. Each of the wheel well covers 12 and 13 are rectangular in configuration having an upper load bearing surface 15 supported by a framework of side bearing supports 16 formed as truss members. The supports 16 are further braced by peripheral rails 17 encompassing the bottom edges of the wheel well covers and the vertical upstanding sides.

Maintaining the wheel well covers 12, 13 is spaced parallel disposition are a plurality of transversely disposed bed supporting girders 18. The girders 18 tie into an angle bar 19 running along the inside of each wheel well cover. A suitable flat bed member 14a is then firmly attached to the bed support girders 18 to give planar load support area. Along the outboard side of the wheel well covers is a longitudinally disposed air conduit housing 21 of channel shaped configuration.

It is envisioned that the vehicle 11 be equipped with a suitable number of inflatable pneumatic tires 22 to effect the load carrying capability of the transportation equipment. Therefore, the present embodiment discloses four inflatable pneumatic tires located to properly distribute loads placed upon the vehicle. The rearmost set of tires 22, indicated by numeral 22a, are mounted upon suitable wheel rims 24 which are properly supported in a rotative manner upon any suitable axle means supported by a rear axle support member 23. The member 23 is then fixedly maintained to the respective wheel well covers 12 or 13, as the case may be.

Since it is desired to move the vehicle 11 about in easy fashion, suitable means are provided to effect concurrent turning, in a lateral direction, of the forwardmost tires 22b. This is effected by having tires 22b mounted upon a wheel rim 24 which is, in turn, secured in the normal manner to the wheel hub 25 as is shown in FIGURE 5. The wheel hub 25 is then conventionally mounted upon a stub axle 26 with bearings 27 interposed to allow the wheel to freely rotate. As is conventional, the stub axle 26 is affixed to the knuckle 28 which is rotatively supported by the knuckle support 29 by means of a kingpin 31. The knuckle support 29 is firmly attached to the respective wheel well cover. To move the tires 22b in a lateral direction in a concurrent manner, there is provided a drawbar 32 pivoted at pivot point 33 to the forwardmost bed support girder 18. Interconnecting the drawbar 32 and each wheel knuckle 28 are tie rods 34.

It is anticipated that once a load is placed upon the vehicle 11 the load will not be removed until it has reached its destination point. Therefore, the entire vehicle 11 will be used as a unitary shipping platform which must be extremely stable during shipment and not subject to undue stress or movement. To effect such a stable platform, the present invention contemplates a centrally disposed fluid pressure means to each of the pneumatic tires 22. For ease of accessibility a master valve 35 is located in the forwardmost portion of the vehicle 11 and, as shown in FIGURES 1 and 3, it is placed near the front bed support girder 18. Such a valve is of the known variety which will suitably mate with a known type of fluid pressure nozzle dispensing means. The fluid pressure flows from the valve 35 and is distributed by the T 36 to the fluid conduit trunk lines 37 which run about the peripheral edges of the vehicle 11. The lines 37 are mainly housed within the air conduit housing 21. Opposite each tire 32 a fluid orifice 38 allows the fluid pressure to be vented therethrough into a housing 39 which communicates with a rotatable seal 31 having a passage 42 therethrough.

The rotatable seal 41 generally comprises an elongated member having a peripherally extending draw flange 43 in which multiple apertures 44 are disposed to act as a race member of a ball bearing system to maintain the ball bearings 45 in proper relation. At one end of the rotatable seal 41 suitable O rings 46 are provided to maintain a fluid tight seal in the system. Maintaining pressure upon the rotatable seal 41 to keep it within the housing 39 is a draw nut 47 which is threadingly engaged to the housing 30 so that the lip 48 bears against the bearing surface of the draw flange 43 to properly position the rotatable seal 41.

At the outermost end of the rotatable seal 41 is a coupling nut 49 which is threadingly engaged into the rotatable seal and maintained against accidental rotation within the rotatable seal by means of a stop pin 51, which engages the threads 52. The other end of the coupling nut 49 is attached to a flexible fluid supply hose 53 which is flexible in its longitudinal direction, but is relatively inflexible and rigid to torsional stresses. The remaining end of the hose 53 is attached to a second coupling nut 54 which is affixed in nonrotatable relation with the fluid supply hose support member 55. Leading from the coupling 54 is a rigid fluid conduit 56 which supplies pressurized fluid to the tires 22 by means of valve 57.

The above disclosed embodiment of the fluid supply mechanism takes into account that the front wheels of the vehicle are designed to turn laterally and there must be suitable flexibility in the supply hose 53 to permit lateral movement of the tires, yet the hose must be rigid to torsional stresses to allow it to rotate without binding. These problems are not encountered in the rear wheels which do not turn laterally and, therefore, the supply hose 53a may be of a rigid nature with the only requirement being that it rotate about its own centerpoint when used with a rotatable seal such as previously described. In all respects the fluid supply system to the rear wheels is identical to that described for the front wheels except for the rigid hose 53a.

The above description to the central fluid pressure supply means is described for only one embodiment for accomplishing the desired purposes of the present invention. Other embodiments which will work equally as well are contemplated and it is desired that the invention not be limited to the precise construction of the air supply system disclosed herein. At least one other contemplated embodiment of the fluid supply means would be to have a separate valve at each wheel location so that each wheel location so that each tire in turn could be separately inflated.

In operation of the present invention it is anticipated that a suitable load of cargo will be placed upon the vehicle 11 preparatory to loading the cargo into a suitable carrier. When the carrier is ready for loading, it is merely necessary to move the vehicle 11 by any suitable means at hand onto the carrier and place the vehicle in its shipping position. It then is necessary to actuate the master fluid pressure control valve 35 to release sufficient fluid from the tires 22 to cause the vehicle 11 to move downwardly and rest upon the planar surface 58. The vehicle 11 would then be firmly supported upon the planar surface and it is extremely stable due to the weight of the cargo which it is carrying. To remove the vehicle 11 from the carrier it is merely necessary to reinflate the tires 22 through the master valve 35 to raise the entire wheel off of the planar surface so that it may be rolled from the carrier to the proper storage point. This, of course, saves much time in that there is no in-between handling of the cargo from the time it is loaded onto the vehicle 11 until the time it is unloaded at its destination point.

Obviously the vehicle 11 may be made of any convenient size to suit the purpose intended and it is envisioned that the vehicle 11 could be self-propelled by merely installing therewith suitable motive means. A very simple solution has been devised herewith to facilitate the now costly procedure of multiple handling of freight cargo between the starting location and the destination point.

Other objects, advantages and capabilities of the invention will become apparent from the following description, taken in conjunction with the accompanying drawings showing only a preferred embodiment of the invention.

What is claimed is:

1. A modular vehicle for transporting bulk materials comprising a pair of spaced parallel elongated longitudinally disposed wheel well covers having a closed top portion and an open bottom portion and truss side portions, a flat bed support area connecting the wheel well covers and being flanked thereby, a plurality of rotatable wheels mounted within each wheel well cover, each wheel having a pneumatic inflatable tire mounted thereon, each of said tires when fully inflated extending through the open bottom portion of the wheel well cover a predetermined amount for contact with a planar supporting surface so that said vehicle is supported on said planar surface entirely by said pneumatic tires when said pneumatic tires are inflated, means to simultaneously control the pressure of fluid in all of said tires at predetermined times to either inflate said tires to cause said vehicle to be supported solely by said tires or to deflate said tires to cause a downward movement of the vehicle so that the bottom portions of the wheel well covers are in contact with the planar surface to support the vehicle in fixed position thereon, said means for inflating and deflating said tires comprising fluid pressure supply means connected to a centrally located valve means, pressure lines extending from said valve means within an air conduit housing located on the exterior side of each elongated wheel well cover, a rotary coupling aligned with the center of each wheel and connected to said pressure line, and an air supply hose connection means extending between said rotary coupling and a valve stem on each wheel to enable ingress and egress of pneumatic fluid within each tire to enable inflation and deflation thereof.

2. The device of claim 1 wherein said hose means comprises a first hose extending from said rotary coupling and connected to a coupling nut which is fixed in nonrotatable relation with a fluid supply hose support member coaxially attached to the exterior side of said wheel and a second hose extending from said coupling nut interiorly of the supply hose support member for connection to the valve stem of each of said wheels.

References Cited

UNITED STATES PATENTS

| | | | |
|---|---|---|---|
| 2,168,690 | 8/1939 | Uksila | 152—416 |
| 2,177,042 | 10/1939 | Michael | 301—41 X |
| 2,463,522 | 3/1949 | Davidson | 152—416 |
| 2,579,048 | 12/1951 | Paul | 152—416 |
| 3,213,993 | 10/1965 | Long | 280—43.17 X |
| 3,237,959 | 3/1966 | Heyl | 280—43.23 |

BENJAMIN HERSH, *Primary Examiner.*

C. C. PARSONS, J. SIEGEL, *Assistant Examiners.*